United States Patent [19]

Vagias

[11] 4,403,418
[45] Sep. 13, 1983

[54] DEVICE TO DETERMINE AND RECORD SMALL DIMENSIONS

[76] Inventor: Ernest Vagias, 265 Prospect St., Baden, Pa. 15005

[21] Appl. No.: 330,338

[22] Filed: Dec. 14, 1981

[51] Int. Cl.³ .......................... G01B 3/18; B43K 29/00
[52] U.S. Cl. .................................... 33/164 R; 33/166; 401/195
[58] Field of Search ..................... 33/143 G, 159, 163, 33/164 R, 164 D, 166, 167; 401/194, 195

[56] References Cited

U.S. PATENT DOCUMENTS

| | | | |
|---|---|---|---|
| 620,337 | 2/1899 | Lavigne | 33/164 D |
| 1,746,065 | 2/1930 | Van Sant | 401/194 |
| 1,768,694 | 7/1930 | Keeran | 401/195 |
| 2,468,581 | 4/1949 | Wells | 33/164 R |
| 2,565,140 | 8/1951 | Leustig | 33/164 R |

FOREIGN PATENT DOCUMENTS

| | | | |
|---|---|---|---|
| 728523 | 12/1966 | Italy | 401/195 |
| 405985 | 7/1966 | Switzerland | 401/195 |
| 560638 | 4/1944 | United Kingdom | 33/166 |

*Primary Examiner*—Richard R. Stearns
*Attorney, Agent, or Firm*—Thomas H. Murray; Clifford A. Poff

[57] ABSTRACT

A threaded extension between two members forming a support housing for writing means is provided with indicia for measuring the dimension of an object. Collar sections at opposite sides of the threaded extension are used to engage with the object placed between the two members.

5 Claims, 8 Drawing Figures

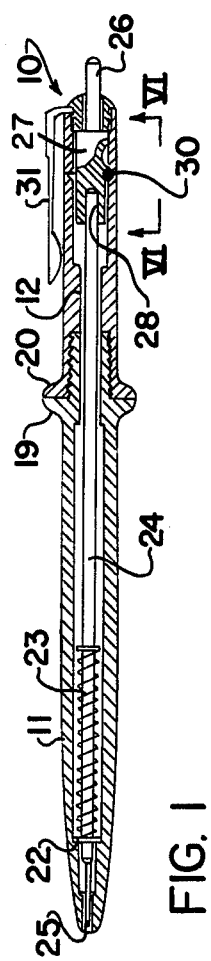
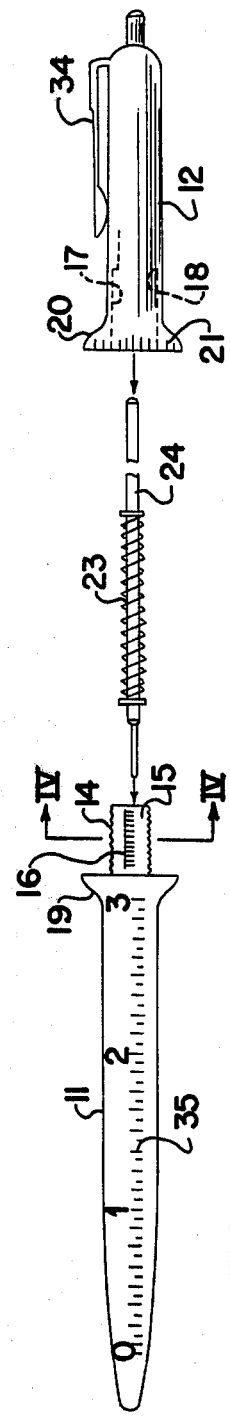
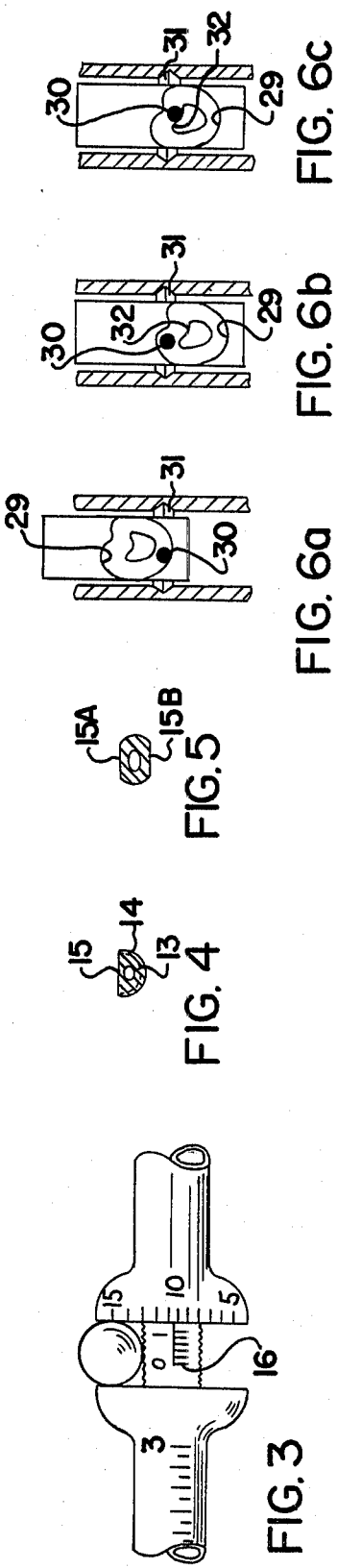
FIG. 1　FIG. 2　FIG. 3　FIG. 4　FIG. 5　FIG. 6a　FIG. 6b　FIG. 6c

DEVICE TO DETERMINE AND RECORD SMALL DIMENSIONS

BACKGROUND OF THE INVENTION

This invention relates to an instrument to record and make precise measurements of an article. More particularly, the present invention relates to a novel construction and arrangement of parts of a writing instrument that also forms a micrometer-type measuring instrument.

The thickness, diameter or distance between two spaced-apart surfaces can be measured by various forms of known instruments such as a caliber or a micrometer, for example, with a high degree of precision. A requisite degree of precision is achieved by the design and construction of the instrument for its intended purpose. In some instances, extreme accuracy is the design criteria for the instrument; whereas in other instances, a lesser degree of accuracy is required. For example, a piano tuner in the course of replacing strings for a piano has a need to identify the strings by their diameter to assure their proper positioning in the instrument. The degree of accuracy, in this instance, is needed for establishing a previously-known diameter whereby the measuring instrument is used for identification purposes. The need to provide an instrument which can also permit the recording of the measurement or any other information enhances the utility and the usefulness of the instrument. This reduces the number of instruments that is required.

SUMMARY OF THE INVENTION

It is an object of the present invention to determine and record a precise dimension by the design and construction of a device that is economical to produce.

More particularly, according to the present invention there is provided a device comprising, in combination, first and second generally cylindrical hollow members having between them a threaded connection, an end of the first member being received within the second member, writing means supported within the first and second members and projecting outwardly from an end of one of the members remote from the threaded connection, collar means upon each of the members, the collar means being adapted to be brought into contact with an object to be measured, and indicia upon each of the members to indicate the dimension to be determined of the object.

In the preferred form of the present invention, the collar means includes a flange on one of the cylindrical members and markings about its external surface forming part of the aforementioned indicia. The threaded connection between the cylindrical members is preferably formed by a tubularly-shaped extension having external threads; a longitudinal flat surface intersecting the threads and indicia on the flat surface. It is preferred that the first and second cylindrical members form bottom and top parts of a writing instrument having means for retractively supporting a reservoir for a writing medium.

These features and advantages of the present invention as well as others will be more fully understood when the following description is read in light of the accompanying drawings, in which:

FIG. 1 is a sectional view through one embodiment of the device according to the present invention;

FIG. 2 is an exploded view of the device shown in FIG. 1;

FIG. 3 is an enlarged view to illustrate the operative relation of parts to determine the diameter of a round object;

FIG. 4 is a sectional view taken along line IV—IV of FIG. 2;

FIG. 5 is a view similar to FIG. 4 but illustrating a modification to the preferred embodiment of the present invention; and FIG. 6a-6c are a series of enlarged sectional views taken along line VI—VI of FIG. 1 illustrating the operational sequence of the retractable mechanism for a writing instrument according to the present invention.

As shown in FIGS. 1 and 2, the device of the present invention includes a housing 10 comprised of a bottom body part 11 and a top body part 12 having between them a threaded connection formed by an externally-threaded tubular extension 13 of bottom section 11. The external surface of extension 13 is provided with continuous threads 14 which are interrupted by a longitudinal flat surface 15 as best shown in FIG. 4. Indica 16 is printed on the flat surface 15. Internal threads 17 extend from one end of the body part 12 to an internal shoulder 18. The threads 14 and 17 have a pitch which is selected so that measurements can be taken by the relative position of the housing part 12 with respect to housing part 11. By way of example only, if there are sixteen threads per inch of length on the tubular section 13, then the upper housing part 12 must be rotated sixteen times to advance the upper housing part of a distance of one inch toward the bottom housing part. Means are provided on the end portions of each of the body parts to engage opposite sides of an article for determining the distance between these sides of the article. The means take the form of collar sections 19 and 20 on the body parts 11 and 12, respectively. The collar sections each has a flat face surface to engage the surface of the article which is being measured. The indicia 16 may form metric units of length or the English system may be used. Depending on the accuracy of the required measurement, a conventional ruler scale can be used to form the indicia 16. In this event, a distance reading is taken by viewing the exposed markings of the indicia which is visible between the collars 19 and 20. More accurate distance readings can be achieved by designing the indicia 16 according to a micrometer scale. Additional indicia 21 on collar 20 is used to provide a measurement of a distance between two incremental indicia 16 on the tubular extension 13. To read a distance measurement between the collar sections 19 and 20 using indicia according to a micrometer, the number of whole divisions which are visible on the scale of indicia on tubular extension 13 is read. This number may be multiplied by some constant with the product added to a reading of the number of subdivisions taken from the scale of indicia on collar 20. The useful range for making measurements is by selecting a corresponding length for the tubular extension 13 and internal threads 18. Typically, the useful measurement range is up to 2 inches. In FIG. 5, there is illustrated a modified embodiment of the present invention wherein the tubular extension 13 has, in cross section, opposite flat surfaces 15A and 15B each having indicia printed thereon to minimize the need for rotating the device when making a measurement.

The lower and upper body parts 11 and 12 embody a construction of internal parts to form a writing instrument. The bottom body part 11 has a shoulder 22 against which a spring 23 is supported while surrounding an end portion of an ink reservoir 24. A small, round rolling ball 25 is housed in a socket at one end of the ink reservoir to form a writing tip for transferring viscous ink onto a writing surface. It is preferred to provide a retractable mechanism so that the writing tip can be retracted into the body of the housing 10 and extended through a small diameter opening at the end of the bottom housing part which is opposite collar 19. Any one of various mechanical systems can be provided to retract and extend the writing tip from the housing. A simplified form of a retractable mechanism is illustrated in FIGS. 1, 6a and 6b which is embodied as a ball catch. A pushbutton 26 projects from the end of the top body part 12 opposite collar 20. The pushbutton engages an actuator rod 27 having a socket opening 28 to receive and end portion of the ink reservoir 24. The actuator shaft has a cylindrical external surface with a cam track 29 formed by an endless recess therein. As shown in FIGS. 6a and 6b, the cam track 29 receives a ball 30 which is retained against axial movement in the top body part by a groove 31. In FIG. 6b, the ink reservoir is shown in its retracted position whereby the pushbutton protrudes from the top part of the housing. The ball is located at the bottom of a cam track which is most remote from the projecting end portion of the pushbutton. When the pushbutton is pressed, the ball moves in the cam track which is of heart-shaped configuration in a counterclockwise direction. The ball is retained by the groove 31 against axial movement along the top body part. As shown in FIG. 6b, the ball advances to an extreme position in the heart-shaped cam track where the force of spring 23 forces the ball against a holding surface 32. The ball is held against surface 32 by the spring force which locks the ink reservoir in a position such that the writing tip of the ink reservoir protrudes from the bottom housing part 11. The ink reservoir is held in this position by the pressure of the spring 23. When the button 25 is pressed again, surface 32 moves from engagement with the ball whereby the ball passes along the cam track to the initial position shown in FIG. 6b. At this position, the reservoir retracts into the body of the instrument. It is preferred to provide a clip 34 for retaining the instrument on a garment or the like in a manner, per se, well known in the art. If desired, indicia to form a scale 35 for a ruler can be placed on the external surface of housing part 11.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A device for use in determining and recording a precise dimension, said device comprising, in combination, first and second generally cylindrical hollow members having between them a threaded connection, an end of said first member being received within said second member, writing means supported within said first and second members and projecting outwardly from an end of one of said members which is remote from said threaded connection, collar means upon each of said members, said collar means being adapted to be brought into contact with an object to be measured, and indicia upon each of said members, said indicia being adapted to indicate the dimension to be determined of said object.

2. The device according to claim 1 wherein said threaded connection includes an extension having a threaded external surface projecting from said first member and an internally-threaded portion in said second member.

3. The device according to claim 2 wherein said extension includes a generally flat surface having said indicia thereon.

4. The device according to claim 3 wherein said extension projects outwardly from said collar means on said first member.

5. The device according to claim 1 further including means to releasably hold said writing means in extended and retracted positions from one of said first and second cylindrical members.

* * * * *